Patented Dec. 14, 1937

2,101,868

UNITED STATES PATENT OFFICE 2,101,868

PROCESS OF MANUFACTURING ACETIC ANHYDRIDE

Martin Mugdan and Johann Sixt, Munich, Germany, assignors to Consortium für Elektrochemische Industrie, G. m. b. H., Munich, Bavaria, Germany, a corporation of Germany No Drawing. Application October 22, 1934, Serial No. 749,484. In Germany November 28, 1933

14 Claims. (Cl. 260—123)

This invention relates to the production of acetic anhydride by thermal dehydration of acetic acid by means of gaseous catalysts and has for its object to obtain a considerably greater yield of acetic anhydride than has been possible with the previous process.

It has been recognized that in dehydrating acetic acid in contact with solid or liquid phosphates, the addition of small quantities of volatile basic nitrogen compounds, such as pyridine, acetamid, ammonia, acetonitrile, etc., promote the reaction, and it has been assumed that this was caused by an increase in the catalytic effect due to the addition of the nitrogen compound.

We have found that such increase in the output of anhydride through the use of nitrogen compounds is not confined to the utilization of solid or liquid phosphorus contacts, and we have furthermore found that the output of anhydride can also be substantially increased through the use of other catalysts if small quantities of volatile basic nitrogen compounds are employed in the process.

This addition of basic nitrogen compounds is of particular advantage when inorganic acids are used as catalysts, especially phosphoric acid, or substances such as phosphorus, phosphoric acid ester, etc. which form phosphoric acid in the heating zone. This important and entirely unexpected effect is produced not only when nitrogent compounds are present in the reaction zone itself, but also when they are mixed with the vapors beyond the heating zone. Our conclusion is that the effect of the nitrogen compounds is to stabilize the production of the anhydride, or prevent reversion or decomposition, instead of merely increasing the catalytic effect as previously supposed. Hence in carrying out our process the nitrogen compounds may be added to the vapors at any point in the vapor circuit, either before or beyond the heating zone, which is preferably maintained at a temperature between 400 and 800° C. The acetic acid, phosphorous compound and nitrogen compound may be mixed in any conventional manner, for example by adding the phosphorus and nitrogen compounds to liquid acetic acid and vaporizing in a heated tube prior to admission to the reaction chamber.

Example I

A carbon tube 500 millimeters high and of 50 millimeters internal diameter, jacketed with an iron cover, was electrically heated to a temperature of 600–670° C. and 1000 parts glacial acetic acid vapor containing one part phosphoric acid vapor and three parts pyridine was passed through at the rate of 600 grams glacial acetic acid per hour. The off-gases coming from the tube were condensed in an adjoining cooler, the condensate containing 66% by weight of acetic anhydride. When the process was performed in the same manner, but without the addition of pyridine, about 40% by weight of anhydride condensate was obtained.

Example II

The process was performed as in Example I with the difference that, instead of one part phosphoric acid, three parts triethylphosphate were employed. The condensate contained 72% by weight of acetic anhydride as against 40% without the use of pyridine.

Example III

The process was performed as in Example I with the difference that, instead of one part phosphoric acid, 0.5 parts phosphorus vapor were employed as catalyst and the pyridine was added beyond the heating zone by means of a branch pipe communicating with the stream at a point where temperature of the off-gases was about 300° C. The condensate contained 73% by weight of acetic anhydride, whereas without the addition of pyridine under the same circumstances about 40% of anhydride was obtained.

The disintegration into undesired products was in all cases small.

In carrying out the invention we can employ advantageously electrical resistance elements located inside the splitting apparatus for conducting heat directly to the acetic acid vapor and we prefer to use resistance elements of this type made of carbon or chrome-rich iron alloys.

The invention claimed is:

1. A process for producing acetic anhydride which comprises heating acetic acid containing a small amount of a phosphorus-containing substance, gaseous at the reaction temperature, and condensing acetic anhydride-containing products, from the aforementioned heating, in the presence of a voltaile basic nitrogen compound.

2. A process for producing acetic anhydride which comprises heating acetic acid containing a small amount of a phosphorus-containing substance, gaseous at the reaction temperature, and condensing acetic anhydride-containing products, from the aforementioned heating, in the presence of a volatile basic nitrogen compound added before said products are below a temperature of 300° C.

3. A process for producing acetic anhydride which comprises heating acetic acid to between 400° C. and 800° C. in the presence of a small amount of a phosphorus-containing substance gaseous at the reaction temperature, and condensing acetic anhydride-containing products, from the aforementioned heating, in the presence of a volatile basic nitrogen compound.

4. A process for producing acetic anhydride which comprises heating acetic acid containing a small amount of phosphoric acid ester to between 400° C. and 800° C., and condensing acetic anhydride-containing products, from the aforementioned heating, in the presence of a volatile basic nitrogen compound added before said products are below a temperature of 300° C.

5. A process for producing acetic anhydride which comprises heating acetic acid at temperatures within the range of about 400°-800° C. in the presence of a catalyst from the group consisting of phosphorus, phosphoric acid and phosphoric acid ester, and condensing acetic anhydride-containing products, from the aforementioned heating, in the presence of a volatile basic nitrogen compound added before said products are below a temperature of 300° C.

6. A process for producing acetic anhydride which comprises mixing a small amount of acetic anhydride-forming catalyst containing phosporus material with acetic acid, pyrolyzing the mixture at a temperature and under conditions whereby acetic anhydride is obtained in the effluent materials from the pyrolysis, and condensing effluent materials in the presence of a volatile stabilizing basic nitrogen compound added before said materials are below a temperature of 300° C.

7. A process for producing acetic anhydride which comprises mixing triethyl phosphate with acetic acid, pyrolyzing the mixture at a temperature above 600° C. to obtain effluent materials having a content of acetic anhydride, and condensing the effluent materials in the presence of a volatile stabilizing basic nitrogen compound.

8. Process of producing acetic anhydride which comprises heating acetic acid containing a small amount of a phosphorus-containing substance gaseous at the reaction temperature to between 400° C. and 800° C., and adding a volatile stabilizing basic nitrogen compound beyond the heating zone.

9. A process for producing acetic anhydride which comprises heating acetic acid containing a small amount of phosphoric acid to between 400° and 800° C., and condensing acetic anhydride-containing products, from the aforementioned heating, in the presence of a volatile basic nitrogen compound.

10. A process for producing acetic anhydride, which comprises heating acetic acid to between 400° and 800° C. in the presence of a small amount of phosphoric acid as a catalyst, and condensing acetic anhydride-containing products, from the aforementioned heating, in the presence of a volatile basic nitrogen compound.

11. A process for producing acetic anhydride which comprises heating acetic acid containing a small amount of a phosphorus-containing substance, gaseous at the reaction temperature, and condensing acetic anhydride-containing products, from the aforementioned heating, in the presence of a volatile basic nitrogen compound added at about 300° C.

12. A process for producing acetic anhydride which comprises heating acetic acid containing a small amount of phosphoric acid ester to between 400° C. and 800° C., and condensing acetic anhydride-containing products, from the aforementioned heating, in the presence of a volatile basic nitrogen compound added at about 300° C.

13. A process for producing acetic anhydride which comprises heating acetic acid at temperatures within the range of about 400°-800° C. in the presence of a catalyst from the group consisting of phosphorus, phosphoric acid and phosphoric acid ester, and condensing acetic anhydride-containing products, from the aforementioned heating, in the presence of a volatile basic nitrogen compound added at 300° C.

14. A process for producing acetic anhydride which comprises mixing a small amount of acetic anhydride-forming catalyst containing phosphorus material with acetic acid, pyrolyzing the mixture at a temperature and under conditions whereby acetic anhydride is obtained in the effluent materials from the pyrolysis, and condensing effluent materials in the presence of a volatile stabilizing basic nitrogen compound added at 300° C.

MARTIN MUGDAN.
JOHANN SIXT.